UNITED STATES PATENT OFFICE.

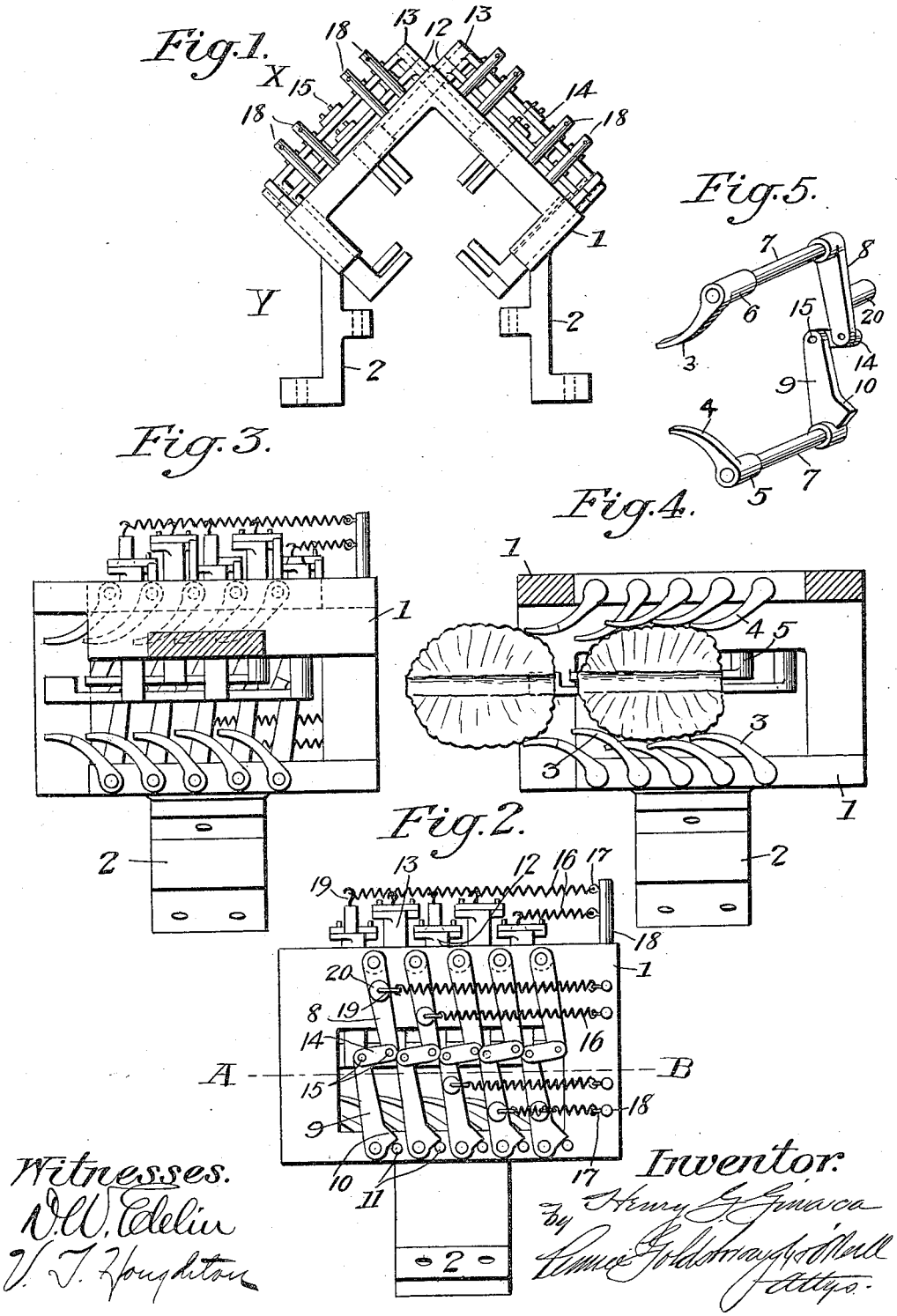

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

CENTERING ATTACHMENT FOR PINEAPPLE-MACHINES.

1,060,248.  Specification of Letters Patent. Patented Apr. 29, 1913.

Application filed April 30, 1912. Serial No. 694,082.

*To all whom it may concern:*

Be it known that I, HENRY GABRIEL GINACA, a citizen of the United States, residing at Honolulu, in the county of Honolulu, Territory of Hawaii, have invented certain new and useful Improvements in Centering Attachments for Pineapple-Machines; and I do hereby declare the following to be a full, clear, and exact description of the invention, such as will enable others skilled in the art to which it appertains to make and use the same.

This invention relates to centering devices, and particularly to a centering attachment for pineapple machines and the like. Its object is to produce an attachment which may be applied to machines for treating fruit, such as pineapples, for example, whereby irregularly shaped as well as symmetrical fruit will be automatically held centered at all times while the fruit is within or moved through the attachment.

My invention contemplates a frame, with means for attaching it to the machine for treating fruit, a plurality of fingers yieldingly disposed on opposite sides of the fruit, the fingers preferably being arranged in two sets of pairs at right angles, inside of and supported by the frame, the adjacent pairs of each row clearing one another, as will hereinafter more fully appear.

The invention consists in the novel construction, combination and arrangement of parts as hereinafter described and claimed, reference being had to the accompanying drawings, forming a part of this specification, in which—

Figure 1 represents a front elevation of a centering attachment embodying my invention. Fig. 2 is a view of the upper left hand side of the attachment shown in Fig. 1 marked X. Fig. 3 is a view from the lower left hand side marked Y in Fig. 1, with one of the supporting legs broken off for the sake of clearness. Fig. 4 is a sectional view on the line A—B of Fig. 2, and shows fruit centered in the attachment. Fig. 5 is a perspective view of one pair of fingers and their connecting levers.

Referring to the drawings, the frame 1 of the machine is preferably a casting as shown, with suitable legs 2 for supporting and attaching same to the machine for treating fruit. A plurality of fingers 3 and 4 are provided, these fingers being similar but curved in opposite directions. The fingers 3 and 4 are arranged alternately with either a short hub 5 or a long hub 6 in order that adjacent fingers shall clear one another, Fig. 4. Each hub 5 or 6 is secured to one end of a shaft 7 adapted to turn in a hole in the frame 1. A lever 8 and a lever 9 are secured outside of the frame 1 to the other ends of the shafts 7 of each pair of fingers 3 and 4 respectively. The levers 8 and 9 are alike except that the lever 9 has a lug 10 to engage a pin or stop 11 in the frame 1. Each pair of levers 8 and 9 is also provided with short hubs 12 and long hubs 13 alternately, so that adjacent levers in each row shall clear one another, as shown. The ends of the levers 8 and 9 of each pair are connected by a link 14 hinged to the ends of said levers by pins 15. A tension spring 16 is provided for each pair of levers 8 and 9, one end of each spring 16 being secured to an eye 17 in a post 18 in the outside of the frame 1 near its front end, and the other end of each spring is attached to a hook 19 in a boss 20 either on a lever 8 or a lever 9 of each pair, so that normally the levers are pulled toward the front end of the attachment until the lug 10 engages the stop 11. In this normal position the fingers 3 and 4 of each pair are pointing rearward with their convex sides toward one another, their approach being limited by the position of the stop 11 in the frame 1, such that the convex side of the fingers of each pair shall be equi-distant from the longitudinal axis or center line of the frame 1. This distance between the fingers of each pair in the normal position is made such as to leave a gap between the tips of the fingers sufficient to permit of the fruit being treated by means passing between adjacent rows of fingers, Fig. 1. The bosses 20 and the posts 18 are made high enough to allow the springs 16 to clear the levers 8 and 9 as shown. If desired, the fingers 3 and 4 of the last pairs may be made with broader faces, as shown.

In operation, the fruit entered at the front end of the frame 1, in any suitable manner, soon encounters the convex sides of the fingers 3 and 4 of the two front pairs, the fruit being engaged thereby in four places in its circumference about 90° apart by said fingers. As the fruit is moved rearward it forces these fingers apart, against the action of their springs 16, the fingers of each pair moving apart an equal amount on account of the link and lever connections as described. When the fruit has been moved farther rearward so that it engages a plurality of the pairs of fingers, the fruit is guided by these fingers and its longitudinal axis is thus made to coincide with the longitudinal axis of the attachment, the fingers of each pair yieldingly engaging opposite sides of the fruit. As the fruit continues rearward the fingers of each pair leave the fruit successively and return to their normal position to repeat the operation with the succeeding fruit. The fruit has thus been automatically held in a centered position by the plurality of pairs of fingers while within the attachment, during which time it may be treated.

The manner of using the centering attachment with a machine for treating fruit is illustrated in my co-pending application, Ser. No. 694,081, filed April 30, 1912.

It will be noted that this attachment is adapted for centering fruit of various sizes and shapes and lengths within the range of the attachment.

It is obvious that the attachment may be made of sufficient length to hold and guide simultaneously several fruits centered in the attachment.

I claim:

1. A centering attachment for pineapple machines comprising, a frame, means for attaching same to the machine, a plurality of pairs of oppositely disposed fingers within the frame, the fingers of each pair coupled together, means to limit the approach of the fingers of each pair, and means for yieldingly resisting the separation of the fingers of each pair.

2. A centering attachment for pineapple machines comprising, a frame, means for attaching same to the machine, a plurality of pairs of oppositely disposed fingers within the frame, the fingers of each pair coupled together, the pairs arranged in two sets forming rows substantially 90° apart, means to limit the approach of the fingers of each pair, and yielding means for resisting the separation of the fingers of each pair.

3. A centering attachment for pineapple machines comprising, a frame, means for attaching same to the machine, a plurality of pairs of fingers within the frame, the fingers of each pair coupled together, the pairs arranged in rows, the adjacent fingers in each row arranged to clear one another, means to limit the approach of the fingers, and yielding means for resisting the separation of the fingers.

4. In an attachment of the kind described, a plurality of circumferentially arranged fruit engaging members, said members arranged in pairs of oppositely disposed members, and means associated with the members of each pair so that a movement of one produces a corresponding opposite movement of the other.

5. In an attachment of the kind described, a plurality of circumferentially arranged fruit engaging members, said members arranged in pairs of oppositely disposed members, and levers associated with the opposite members of each pair so that a movement of one produces a corresponding opposite movement of the other.

6. In an attachment of the kind described, a plurality of circumferentially arranged fruit engaging members, said members arranged in pairs of oppositely disposed members, levers associated with the opposite members of each pair so that a movement of one produces a corresponding opposite movement of the other, and yielding means for resisting their separation.

7. In an attachment of the kind described, adapted for use with a machine provided with propelling means, a frame provided with a gap, fingers pointing in the same direction within the frame, said gap in the frame adapted to permit the passage through the frame of said propelling means which projects laterally into the frame.

8. In an attachment of the kind described, adapted for use with a machine provided with propelling means, a frame provided with a gap, fingers pointing rearward and arranged in rows within the frame, said gap in the frame adapted to permit the passage through the frame of said propelling means which projects laterally into the frame, and passageways between the tips of the fingers of adjacent rows, for the purpose described.

9. In an attachment of the kind described, a frame, a plurality of circumferentially arranged fruit engaging members pivoted within the frame, said members arranged in pairs of oppositely disposed members, connections associated with said fruit engaging members so that a movement of one produces a corresponding opposite movement of the other, and means acting on said members to oppose the separation thereof.

10. In an attachment of the kind described, a frame, a plurality of sets of fingers pivoted within the frame, said sets comprising oppositely disposed series of such fingers, said fingers being curved with their convex sides toward one another, and yielding means outside of the frame for resisting the separation of said fingers.

11. In an attachment of the kind described, a frame, and a plurality of sets of yieldingly disposed pivoted fingers, each set comprising oppositely disposed series of such fingers within the frame, said fingers normally equi-distant from the longitudinal axis of the frame.

12. In an attachment of the kind described, a frame, a plurality of sets of yielding curved fingers pivoted within the frame each set comprising oppositely disposed series of such fingers, all of said fingers forming a yielding passageway for the fruit.

13. In an attachment of the kind described, a frame, a plurality of sets of curved fingers pivoted within the frame forming a yielding passageway, each of said sets comprising oppositely disposed series of such fingers and the front fingers forming a throat for the entrance of fruit.

14. In a machine of the kind described, a plurality of sets of fingers, each set comprising oppositely disposed series of such fingers, the opposite fingers of each series coupled together, and said fingers adapted to engage the fruit in a plurality of places, for the purpose of centering and guiding the fruit.

15. A centering attachment for machines of the kind described comprising a plurality of series of longitudinally grouped fingers, means for connecting the opposite fingers such that a movement of the one produces a corresponding opposite movement of the other, said fingers being so placed that the fruit will be engaged by said fingers at a plurality of points throughout its length.

In testimony whereof I affix my signature, in presence of two witnesses.

HENRY GABRIEL GINACA.

Witnesses:
ROBT. J. PRATT,
ARTHUR F. EWART.

---

Copies of this patent may be obtained for five cents each, by addressing the "Commissioner of Patents, Washington, D. C."